(12) United States Patent
McAlister

(10) Patent No.: US 8,318,269 B2
(45) Date of Patent: Nov. 27, 2012

(54) INDUCTION FOR THERMOCHEMICAL PROCESSES, AND ASSOCIATED SYSTEMS AND METHODS

(75) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

(21) Appl. No.: 13/027,215

(22) Filed: Feb. 14, 2011

(65) Prior Publication Data

US 2011/0207008 A1 Aug. 25, 2011

Related U.S. Application Data

(63) Continuation-in-part of application No. 12/857,228, filed on Aug. 16, 2010, which is a continuation-in-part of application No. 12/707,651, filed on Feb. 17, 2010, and a continuation-in-part of application No. PCT/US2010/024497, filed on Feb. 17, 2010, and a continuation-in-part of application No. 12/707,653, filed on Feb. 17, 2010, and a continuation-in-part of application No. 12/707,656, filed on Feb. 17, 2010, and a continuation-in-part of application No. PCT/US2010/024499, filed on Feb. 17, 2010, and a continuation-in-part of application No. PCT/US2010/024498, filed on Feb. 17, 2010.

(60) Provisional application No. 61/304,403, filed on Feb. 13, 2010, provisional application No. 61/153,253, filed on Feb. 17, 2009, provisional application No. 61/237,476, filed on Aug. 27, 2009.

(51) Int. Cl.
*C30B 25/10* (2006.01)

(52) U.S. Cl. ....... 427/587; 427/590; 427/591; 118/723 I
(58) Field of Classification Search ........................ None
See application file for complete search history.

(56) References Cited

U.S. PATENT DOCUMENTS 4,019,868 A    4/1977    Sebacher et al.
(Continued)

FOREIGN PATENT DOCUMENTS

EP    1658892    5/2006
(Continued)

OTHER PUBLICATIONS

"Carnot Thermochemical Cycles." Digital image. Wikipedia, the Free Encyclopedia, Published: Aug. 31, 2010. Accessed: Jan. 4, 2011. Printed: May 20, 2011. <http://en.wikipedia.org/wiki/File:Carnot_thermochemical_cycles.PNG>. p. 1.

(Continued)

*Primary Examiner* — Joseph Miller, Jr.
(74) *Attorney, Agent, or Firm* — Perkins Coie LLP

(57) ABSTRACT

Induction for thermochemical processes, and associated systems and methods are disclosed. A method in accordance with a particular embodiment includes placing first and second substrates in a reactor, with each substrate having a surface facing toward the other. Method can further include directing a precursor gas into the reactor and activating an induction coil proximate to the facing surfaces of the substrates to dissociate the precursor gas. A constituent of the precursor gas is deposited on both the first and second surfaces, and heat radiated from each surface and/or a constituent deposited on the surface is received at the other surface and/or the constituent deposited on the other surface.

20 Claims, 2 Drawing Sheets

U.S. PATENT DOCUMENTS

| | | | |
|---|---|---|---|
| 4,053,576 A | 10/1977 | Fletcher | |
| 4,070,861 A | 1/1978 | Scragg et al. | |
| 4,099,489 A | 7/1978 | Bradley | |
| 4,172,506 A | 10/1979 | Terry | |
| 4,229,184 A | 10/1980 | Gregg | |
| 4,382,189 A | 5/1983 | Wilson | |
| 4,386,801 A | 6/1983 | Chapman et al. | |
| 4,401,689 A | 8/1983 | Ban | |
| 4,455,045 A | 6/1984 | Wheeler | |
| 4,549,528 A | 10/1985 | Gibson | |
| 4,601,508 A | 7/1986 | Kerian | |
| 4,611,847 A | 9/1986 | Sullivan | |
| 4,706,651 A | 11/1987 | Yudow | |
| 4,746,160 A | 5/1988 | Wiesemeyer | |
| 4,978,162 A | 12/1990 | Labbe | |
| 5,058,945 A | 10/1991 | Elliott, Sr. et al. | |
| 5,119,897 A | 6/1992 | Moriwake | |
| 5,222,698 A | 6/1993 | Nelson et al. | |
| 5,280,990 A | 1/1994 | Rinard | |
| 5,348,774 A * | 9/1994 | Golecki et al. | 427/543 |
| 5,407,245 A | 4/1995 | Geropp | |
| 5,498,059 A | 3/1996 | Switlik | |
| 5,560,443 A | 10/1996 | DuBose | |
| 5,647,877 A | 7/1997 | Epstein | |
| 5,882,382 A | 3/1999 | Hachisuka et al. | |
| 5,964,949 A | 10/1999 | Savas | |
| 5,986,429 A | 11/1999 | Mula, Jr. | |
| 6,068,328 A | 5/2000 | Gazdzinski | |
| 6,081,183 A | 6/2000 | Mading et al. | |
| 6,092,861 A | 7/2000 | Whelan | |
| 6,155,212 A | 12/2000 | McAlister | |
| 6,200,069 B1 | 3/2001 | Miller | |
| 6,216,599 B1 | 4/2001 | Cavanagh | |
| 6,220,193 B1 | 4/2001 | Dilks | |
| 6,242,752 B1 | 6/2001 | Soma et al. | |
| 6,309,010 B1 | 10/2001 | Whitten | |
| 6,378,932 B1 | 4/2002 | Fasel et al. | |
| 6,409,252 B1 | 6/2002 | Andrus | |
| 6,464,755 B2 | 10/2002 | Nakanishi et al. | |
| 6,502,533 B1 | 1/2003 | Meacham | |
| 6,508,209 B1 | 1/2003 | Collier, Jr. | |
| 6,585,785 B1 | 7/2003 | Warren et al. | |
| 6,749,043 B2 | 6/2004 | Brown et al. | |
| 6,756,140 B1 | 6/2004 | McAlister | |
| 6,838,782 B2 | 1/2005 | Vu | |
| 6,854,788 B1 | 2/2005 | Graham | |
| 6,897,575 B1 | 5/2005 | Yu | |
| 6,926,345 B2 | 8/2005 | Ortega et al. | |
| 6,951,786 B2 | 10/2005 | Hu | |
| 6,979,049 B2 | 12/2005 | Ortega et al. | |
| 7,033,570 B2 | 4/2006 | Weimer et al. | |
| 7,140,181 B1 | 11/2006 | Jensen et al. | |
| 7,152,908 B2 | 12/2006 | Shahbazi | |
| 7,165,804 B2 | 1/2007 | Shahbazi | |
| 7,185,944 B2 | 3/2007 | Shahbazi | |
| 7,207,620 B2 | 4/2007 | Cosgrove et al. | |
| 7,210,467 B2 | 5/2007 | Kweon et al. | |
| 7,211,905 B1 | 5/2007 | McDavid, Jr. | |
| 7,237,827 B2 | 7/2007 | Shahbazi | |
| 7,243,980 B2 | 7/2007 | Vala | |
| 7,293,533 B2 | 11/2007 | Hemsath | |
| 7,449,158 B2 | 11/2008 | Haueter et al. | |
| 7,568,479 B2 | 8/2009 | Rabinowitz | |
| 7,628,137 B1 | 12/2009 | McAlister | |
| 2001/0000889 A1* | 5/2001 | Yadav et al. | 204/242 |
| 2002/0102188 A1 | 8/2002 | Hsu | |
| 2002/0146506 A1* | 10/2002 | Yoo | 427/150 |
| 2003/0019104 A1 | 1/2003 | Smalc | |
| 2003/0042128 A1 | 3/2003 | Harutyunyan et al. | |
| 2003/0089680 A1 | 5/2003 | Johnson et al. | |
| 2003/0182861 A1 | 10/2003 | Weimer et al. | |
| 2004/0033455 A1 | 2/2004 | Tonkovich et al. | |
| 2004/0265448 A1 | 12/2004 | Shiau et al. | |
| 2004/0266615 A1 | 12/2004 | Watson et al. | |
| 2005/0272856 A1 | 12/2005 | Cooper et al. | |
| 2006/0005738 A1 | 1/2006 | Kumar | |
| 2006/0005739 A1 | 1/2006 | Kumar | |
| 2006/0048808 A1 | 3/2006 | Ruckman et al. | |
| 2007/0138006 A1 | 6/2007 | Oakes et al. | |
| 2007/0194016 A1 | 8/2007 | Dalton | |
| 2007/0214986 A1 | 9/2007 | Gaus et al. | |
| 2008/0086946 A1 | 4/2008 | Weimer et al. | |
| 2008/0175766 A1 | 7/2008 | Mankins et al. | |
| 2008/0248657 A1* | 10/2008 | Nenyei et al. | 438/799 |
| 2008/0295883 A1 | 12/2008 | Ducellier et al. | |
| 2008/0314411 A1 | 12/2008 | Mueller et al. | |
| 2009/0232716 A1 | 9/2009 | Rohrich et al. | |
| 2009/0313886 A1 | 12/2009 | Hinman et al. | |
| 2010/0107994 A1 | 5/2010 | Moriarty et al. | |
| 2010/0174124 A1 | 7/2010 | Tonkovich et al. | |

FOREIGN PATENT DOCUMENTS

| | | |
|---|---|---|
| JP | 58-120510 A | 7/1983 |

OTHER PUBLICATIONS

"Closed Loop Thermochemical Energy Storage System Using Ammonia." Australian National University College of Engineering & Computer Science—Solar Thermal Group. Accessed: Jan. 4, 2011. Printed: May 20, 2011. <http://solar-thermal.anu.edu.au/high-temperature/thermochemical-energy-storage/>. pp. 1-2, Feb. 2010.

"SI Cycle." Digital image. Sandia National Laboratories: Energy, Resources and Nonproliferation. Accessed: Jan. 4, 2011. Printed: Jun. 13, 2011. <http://www.sandia.gov/ERN/images/SI-cycle2.jpg>. p. 1.

"Solar Hydrogen." Digital image. Swiss Federal Institute of Technology, Department of Mechanical and Process Engineering, Zurich. Accessed: Jan. 4, 2011. Printed: May 23, 2011. p. 1. <http://www.pre.ethz.ch/research/projects/imgs/solarhydro_1.jpg>.

"The Solar Zinc Route." Digital image. Swiss Federal Institute of Technology, Department of Mechanical and Process Engineering, Zurich. Accessed: Jan. 4, 2011. Printed: May 20, 2011. <http://www.pre.ethz.ch/research/projects/imgs/solzinc_1.jpg>. p. 1.

"Zinc Zinc-oxide Thermochemical Cycle." Digital image. Wikipedia, the Free Encyclopedia, Published: Dec. 21, 2008. Accessed: Jan. 4, 2011. Printed: May 20, 2011. <http://en.wikipedia.org/wiki/File:Zinc_zinc-oxide_thermochemical_cycle.jpg>. p. 1.

Chen et al. "Parylene-Encapsulated Copolymeric Membranes as Localized and Sustained Drug Delivery Platforms." Annals of Biomedical Engineering, vol. 37, Issue 10 (Oct. 2009): pp. 2003-2017.

Chen et al. "Thermochemistry Concept Map." Teacherknowledge Wikispace, Published: Nov. 20, 2006. <http://teacherknowledge.wikispaces.com/file/view/Thermochemistry+concept+map+-+Extended.pdf>. p. 1.

Food and Agriculture Organization of the United Nations. "Carbon Sequestration Options under the Clean Development Mechanism to Address Land Degradation." World Soil Resources Reports. Rome, 2000. pp. 1-45.

Foust et al. "An Economic and Environmental Comparison of a Biochemical and a Thermochemical Lignocellulosic Ethanol Conversion Processes." Cellulose, vol. 16, Issue 4. Jun. 10, 2009. pp. 547-565.

Funk, James E. "Thermochemical Processes for the Production of Hydrogen from Water." College of Engineering, University of Kentucky, Lexington, Kentucky. 1975. pp. 1-9.

Hackett et al. "Evaluation of Conversion Technoloigy Processes and Products: Appendix A—Discussion of Thermochemical Process Definitions." University of California, Davis. Sep. 2004. pp. 1-7.

US Environmental Protection Agency. "Carbon Dioxide | Climate Change—Greenhouse Gas Emissions | U.S. EPA". Web. Accessed: Jul. 1, 2010. Printed: Jun. 13, 2011. 1 Page. <http://www.epa.gov/climatechange/emissions/co2.html>.

U.S. Energy Information Administration. "Greenhouse Gases—Energy Explained, Your Guide to Understanding Energy." Web. Accessed: Jul. 1, 2010. Printed: Jun. 13, 2011. 1 Pages. <http://www.eia.gov/energyexplained/index.cfm?page=environment_about_ghg>.

"The Carbon Cycle : Feature Articles." NASA Earth Observatory : Home. Web. Accessed: Jul. 1, 2010. Printed: Jun. 13, 2011. 12 Pages. <http://earthobservatory.nasa.gov/Features/CarbonCycle>.

Kasting, James F. "The Carbon Cycle, Climate, and the Long-Term Effects of Fossil Fuel Burning." U.S. Global Change Research Information Office. 1998. Web. Accessed: Jul. 1, 2010. Printed: Jun. 13, 2011. <http://www.gcrio.org/CONSEQUENCES/vol4no1/carbcycle.html>.

US Environmental Protection Agency. "Cap and Trade." Web. Accessed: Jul. 1, 2010. Printed: Jun. 13, 2011. <http://www.epa.gov/captrade/>.

US Environmental Protection Agency. "EPA Preliminary Analysis of the Waxman-Markey Discussion Draft". Web. Published: Apr. 20, 2009. Accessed: Jul. 1, 2010. Printed: Jun. 13, 2011. <http://www.epa.gov/climatechange/economics/pdfs/WM-Analysis.pdf>.

US Environmental Protection Agency. "Carbon Dioxide—Geologic Sequestration | Climate Change—Greenhouse Gas Emissions | U.S. EPA." Web. Accessed: Jul. 1, 2010. Printed: Jun. 13, 2011. <http://www.epa.gov/climatechange/emissions/co2_geosequest.html>.

First Action Interview Pilot Program Office Action for U.S. Appl. No. 13/027,015; Applicant: McAlister Technologies, LLC; Date of Mailing: Jul. 29, 2011, 4 pages.

First Action Interview Office Action for U.S. Appl. No. 13/027,181; Applicant: McAlister Technologies, LLC; Mailed on Nov. 16, 2011; 15 pages.

First Action Interview Pilot Program Office Action for U.S. Appl. No. 13/026,990; Applicant McAlister Technologies, LLC; Date of Mailing: Nov. 16, 2011; 15 pages.

First Action Interview Pilot Program Office Action for U.S. Appl. No. 13/026,996; Applicant McAlister Technologies, LLC; Date of Mailing: Oct. 27, 2011; 19 pages.

First Action Interview Pilot Program Office Action for U.S. Appl. No. 13/027,015; Applicant: McAlister Technologies, LLC; Date of Mailing: Oct. 6, 2011, 4 pages.

International Search Report and Written Opinion for PCT Application No. PCT/US11/024802; Applicant McAlister Technologies, LLC; Date of Mailing: Oct. 24, 2011; 9 pages.

International Search Report and Written Opinion for Application No. PCT/US2011/024802; Applicant: McAlister Technologies, LLC; Date of Mailing: Oct. 24, 2011 (9 pages).

* cited by examiner

US 8,318,269 B2

INDUCTION FOR THERMOCHEMICAL PROCESSES, AND ASSOCIATED SYSTEMS AND METHODS

CROSS-REFERENCE TO RELATED APPLICATIONS

The present application claims priority to pending U.S. Provisional Application 61/304,403, filed Feb. 13, 2010. The present application is also a continuation in part of U.S. patent application Ser. No. 12/857,228, filed on Aug. 16, 2010 and titled GAS HYDRATE CONVERSION SYSTEM FOR HARVESTING HYDROCARBON HYDRATE DEPOSITS, which claims priority to and the benefit of U.S. Provisional Application No. 61/304,403, filed Feb. 13, 2010 and titled FULL SPECTRUM ENERGY AND RESOURCE INDEPENDENCE. U.S. patent application Ser. No. 12/857,228 is also a continuation-in-part of each of the following applications: U.S. patent application Ser. No. 12/707,651, filed Feb. 17, 2010 and titled ELECTROLYTIC CELL AND METHOD OF USE THEREOF; PCT Application No. PCT/US10/24497, filed Feb. 17, 2010 and titled ELECTROLYTIC CELL AND METHOD OF USE THEREOF; U.S. patent application Ser. No. 12/707,653, filed Feb. 17, 2010 and titled APPARATUS AND METHOD FOR CONTROLLING NUCLEATION DURING ELECTROLYSIS; PCT Application No. PCT/US10/24498, filed Feb. 17, 2010 and titled APPARATUS AND METHOD FOR CONTROLLING NUCLEATION DURING ELECTROLYSIS; U.S. patent application Ser. No. 12/707,656, filed Feb. 17, 2010 and titled APPARATUS AND METHOD FOR GAS CAPTURE DURING ELECTROLYSIS; and PCT Application No. PCT/US10/24499, filed Feb. 17, 2010 and titled APPARATUS AND METHOD FOR CONTROLLING NUCLEATION DURING ELECTROLYSIS; each of which claims priority to and the benefit of the following applications: U.S. Provisional Patent Application No. 61/153,253, filed Feb. 17, 2009 and titled FULL SPECTRUM ENERGY; U.S. Provisional Patent Application No. 61/237,476, filed Aug. 27, 2009 and titled ELECTROLYZER AND ENERGY INDEPENDENCE TECHNOLOGIES; U.S. Provisional Application No. 61/304,403, filed Feb. 13, 2010 and titled FULL SPECTRUM ENERGY AND RESOURCE INDEPENDENCE. Each of these applications is incorporated by reference in its entirety. To the extent the foregoing application and/or any other materials incorporated herein by reference conflict with the disclosure presented herein, the disclosure herein controls.

TECHNICAL FIELD

The present technology is directed generally to induction for thermochemical processes, and associated systems and methods. In particular embodiments, induction techniques can be used to dissociate a hydrocarbon into hydrogen and carbon, with the carbon deposited on a substrate to form a useful durable good, and with the hydrogen removed for use as a fuel.

BACKGROUND

Renewable energy sources such as solar, wind, wave, falling water, and biomass-based sources have tremendous potential as significant energy sources, but currently suffer from a variety of problems that prohibit widespread adoption. For example, using renewable energy sources in the production of electricity is dependent on the availability of the sources, which can be intermittent. Solar energy is limited by the sun's availability (i.e., daytime only), wind energy is limited by the variability of wind, falling water energy is limited by droughts, and biomass energy is limited by seasonal variances, among other things. As a result of these and other factors, much of the energy from renewable sources, captured or not captured, tends to be wasted.

The foregoing inefficiencies associated with capturing and saving energy limit the growth of renewable energy sources into viable energy providers for many regions of the world, because they often lead to high costs of producing energy. Thus, the world continues to rely on oil and other fossil fuels as major energy sources because, at least in part, government subsidies and other programs supporting technology developments associated with fossil fuels make it deceptively convenient and seemingly inexpensive to use such fuels. At the same time, the replacement cost for the expended resources, and the costs of environment degradation, health impacts, and other by-products of fossil fuel use are not included in the purchase price of the energy resulting from these fuels.

In light of the foregoing and other drawbacks currently associated with sustainably producing renewable resources, there remains a need for improving the efficiencies and commercial viabilities of producing products and fuels with such resources.

DETAILED DESCRIPTION

1. Overview

Figure 1:
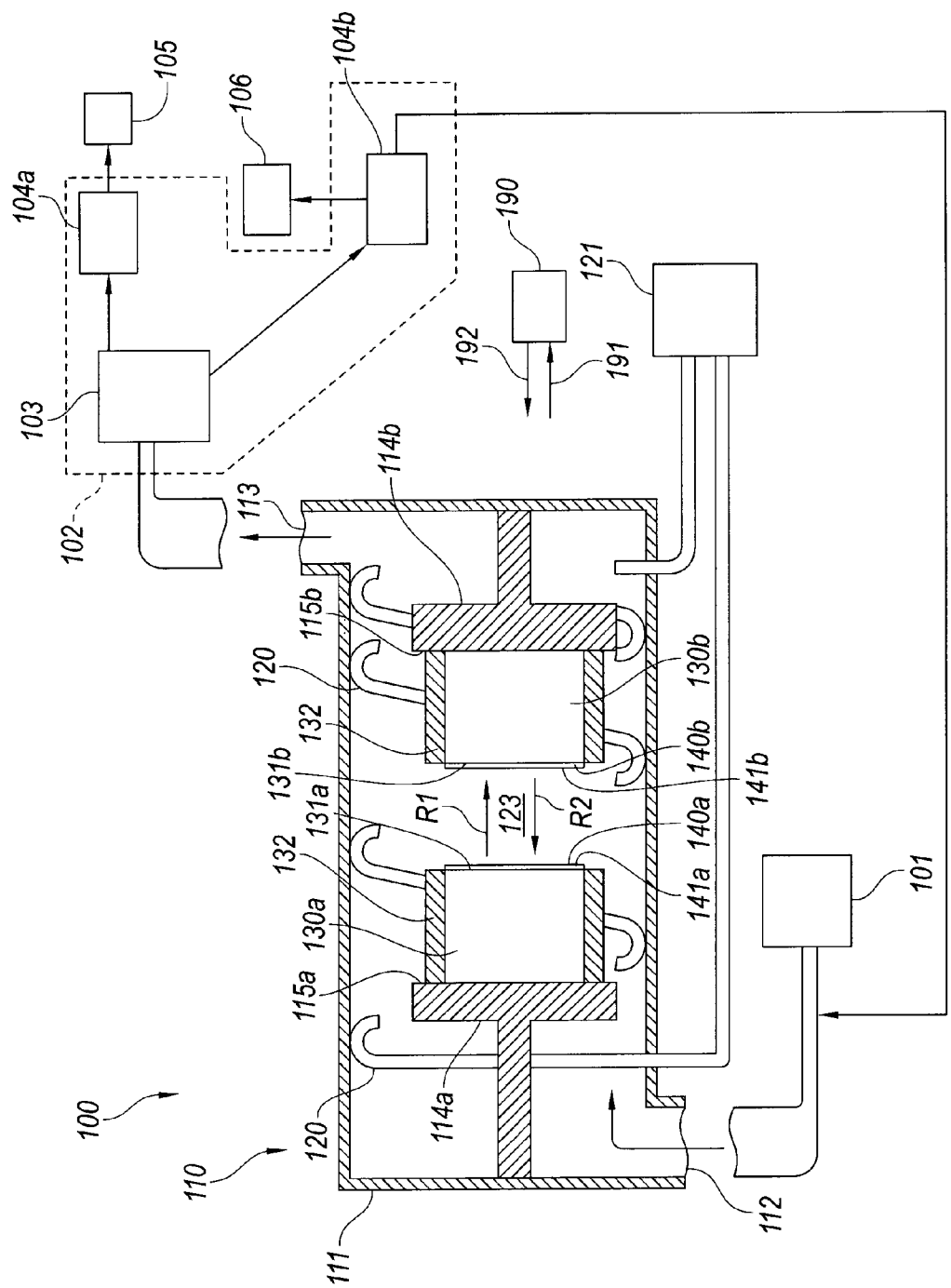
FIG. 1 is a partially schematic illustration of a system having a reactor with facing substrates for operation in a batch mode in accordance with an embodiment of the presently disclosed technology.

Several examples of devices, systems and methods for inductively processing constituents in a chemical reactor are described below. Such processes and associated reactors can be used to produce hydrogen fuels and/or other useful end products. Accordingly, the reactors can produce clean-burning fuel and can re-purpose carbon and/or other constituents for use in durable goods, including polymers and carbon composites. Although the following description provides many specific details of the following examples in a manner sufficient to enable a person skilled in the relevant art to practice, make and use them, several of the details and advantages described below may not be necessary to practice certain examples of the technology. Additionally, the technology may include other examples that are within the scope of the claims but are not described here in detail.

References throughout this specification to "one example," "an example," "one embodiment" or "an embodiment" mean that a particular feature, structure, process or characteristic described in connection with the example is included in at least one example of the present technology. Thus, the occurrences of the phrases "in one example," "in an example," "one embodiment" or "an embodiment" in various places throughout this specification are not necessarily all referring to the same example. Furthermore, the particular features, structures, routines, steps or characteristics may be combined in any suitable manner in one or more examples of the technology. The headings provided herein are for convenience only and are not intended to limit or interpret the scope or meaning of the claimed technology.

Certain embodiments of the technology described below may take the form of computer-executable instructions, including routines executed by a programmable computer or controller. Those skilled in the relevant art will appreciate that the technology can be practiced on computer or controller systems other than those shown and described below. The technology can be embodied in a special-purpose computer, controller, or data processor that is specifically programmed, configured or constructed to perform one or more of the computer-executable instructions described below. Accordingly, the terms "computer" and "controller" as generally used herein refer to any data processor and can include internet appliances, hand-held devices, multi-processor systems, programmable consumer electronics, network computers, mini-computers, and the like. The technology can also be practiced in distributed environments where tasks or modules are performed by remote processing devices that are linked through a communications network. Aspects of the technology described below may be stored or distributed on computer-readable media, including magnetic or optically readable or removable computer discs as well as media distributed electronically over networks. In particular embodiments, data structures and transmissions of data particular to aspects of the technology are also encompassed within the scope of the present technology. The present technology encompasses both methods of programming computer-readable media to perform particular steps, as well as executing the steps.

A method for forming a material in accordance with a particular embodiment includes placing a first substrate in a reactor, with the first substrate having an exposed first surface. The method can further include placing a second substrate in the reactor, with the second substrate having an exposed second surface facing toward the first surface. A precursor gas is directed into the reactor, and is dissociated by activating an induction coil. The method further includes depositing a constituent of the precursor gas on both the first and second surfaces. The method can still further include receiving heat radiated from the first surface and/or the constituent deposited on the first surface at the second surface and/or the constituent deposited on the second surface. Heat radiated from the second surface and/or the constituent deposited on the second surface is received at the first surface and/or the constituent deposited on the first surface. This arrangement can conserve the energy required to carry out the process by receiving energy radiated from a first product as the first product is being formed, at a second product as the second product is being formed.

A reactor in accordance with a particular embodiment of the technology includes a reactor vessel having a reaction zone, an induction coil positioned around the reaction zone, and a reactant supply coupled in fluid communication with the reaction zone. The reactor further includes a first substrate support positioned proximate to the reaction zone to support a first substrate, and a second substrate support positioned proximate to the reaction zone to support a second substrate, in an orientation facing toward the first substrate support. Accordingly, the reactor can facilitate a deposition process in which radiation emitted by a product carried by one support is received by the product carried by the other support.

2. Representative Reactors and Associated Methodologies

FIG. 1 is a partially schematic, partial cross-sectional illustration of a system 100 having a reactor 110 configured in accordance with an embodiment of the presently disclosed technology. In one aspect of this embodiment, the reactor 110 includes a reactor vessel 111 having a reaction or induction zone 123 which is heated by an induction coil 120. The induction coil 120 can be a liquid-cooled, high frequency alternating current coil coupled to a suitable electrical power source 121. The reactor vessel 111 can further include an entrance port 112 coupled to a precursor gas source 101 to receive a suitable precursor gas, and an exit port 113 positioned to remove spent gas and/or other constituents from the vessel 111. In a particular embodiment, the precursor gas source 101 carries a hydrocarbon gas (e.g., methane), which is dissociated into carbon and hydrogen at the induction zone 123. The carbon is then deposited on a substrate to form a product, as is described further below, and the hydrogen and/or other constituents are removed for further processing, as is also described further below.

The reaction vessel 111 houses a first support 114a having a first support surface 115a, and a second support 114b having a second support surface 115b facing toward the first support surface 115a. Each support 114a, 114b can carry a substrate upon which one or more constituents of the precursor gas are deposited. For example, the first support 114a can carry a first substrate 130a and the second support 114b can carry a second substrate 130b. In a representative embodiment in which the precursor gas is selected to deposit carbon, the first and second substances 130a, 130b can also include carbon, e.g., in the form of graphite or a constituent of steel. When the precursor gas includes a different deposition element (e.g., nitrogen and/or boron), the composition of the first and second substrates 130a, 130b can be different. Each of the substrates 130a, 130b can have an initially exposed surface facing the other. Accordingly, the first substrate 130a can have an exposed first surface 131a facing toward a second exposed surface 131b of the second substrate 130b. The remaining surfaces of each substrate 130a, 130b can be insulated to prevent or significantly restrict radiation losses from these surfaces. The supports 114a, 114b can insulate at least one surface of each of the substrates 130a, 130b. The other surfaces (other than the exposed first and second substrates 131a, 131b) can be protected by a corresponding insulator 132. The insulator 132 can be formed from a suitable high temperature ceramic or other material.

The system 100 can further include a controller 190 that receives input signals 191 from any of a variety of sensors, transducers, and/or other elements of the system 100, and in response to information received from these elements, delivers control signals 192 to adjust operational parameters of the system 100. These parameters can include the pressures and flow rates with which the gaseous constituents are provided to and/or removed from the reactor vessel 111, the operation of the induction coil 120 and associated power source 121, and the operation of a separator 103 (described below), among others.

In operation, the precursor gas source 101 supplies gas to the induction zone 123, the induction coil 120 is activated, and the precursor gas dissociates into at least one constituent (e.g., carbon) that is deposited onto the first and second substrates 130a, 130b. The constituent can be deposited in an epitaxial process that preserves the crystal grain orientation of the corresponding substrate 130a, 130b. Accordingly, the deposited constituent can also have a crystal and/or other self-organized structure. As the constituent is deposited, it forms a first formed structure or product 140a at the first substrate 130a, and a second formed structure or product 140b at the second substrate 130b. The first and second formed structures 140a, 140b each have a corresponding exposed surface 141a, 141b facing toward the other. The structures 140a, 140b can have the same or different cross-sectional shapes and/or areas, and/or can have non-crystalline, single crystal or multicrystal organizations, depending upon the selected embodiment. Radiation emitted by the first exposed surface 131a of the first substrate 130a, and/or by the first exposed surface 141a of the first formed structure 140a (collectively identified by arrow R1) is received at the second exposed surface 141b of the second formed structure 140b, and/or the second exposed surface 131b of the second substrate 130b. Similarly, radiation emitted by the second exposed surface 141b of the second formed structure 140b and/or the second exposed surface 131b of the second substrate 130b (collectively identified by arrow R2) is received at the first formed structure 140a and/or the first substrate 130a.

As the formed structures 140a, 140b grow, the exit port 113 provides an opening through which residual constituents from the dissociated precursor gas and/or non-dissociated quantities of the precursor gas can pass. These constituents are directed to a collection system 102, which can include a separator 103 configured to separate the constituents into two or more flow streams. For example, the separator 103 can direct one stream of constituents to a first product collector 104a, and a second stream of constituents to a second product collector 104b. In a particular embodiment, the first product collector 104a can collect pure or substantially pure hydrogen, which can be delivered to a hydrogen-based fuel cell 105 or other device that requires hydrogen at a relatively high level of purity. The second stream of constituents directed to the second product collector 104b can include hydrogen mixed with other elements or compounds. Such elements or compounds can include methane or another undissociated precursor gas, and/or carbon (or another element or compound targeted for deposition) that was not deposited on the first substrate 130a or the second substrate 130b. These constituents can be directed to an engine 106, for example, a turbine engine or another type of internal combustion engine that can burn a mixture of hydrogen and the other constituents. The engine 106 and/or the fuel cell 105 can provide power for any number of devices, including the electrical power source 121 for the inductive coil 120. In another aspect of this embodiment, at least some of the constituents (e.g., undissociated precursor gas) received at the second collector 104b can be directed back into the reactor 110 via the entrance port 112.

An advantage of the foregoing arrangement is that the radiation losses typically encountered in a chemical vapor deposition apparatus can be avoided by positioning multiple substrates in a manner that allows radiation emitted from one surface to be received by another surface that is also targeted for deposition. In a particular embodiment shown in FIG. 1, two substrates are shown, each having a single exposed surface facing the other. In other embodiments, additional substrates can be positioned (e.g., in a plane extending inwardly and/or outwardly transverse to the plane of FIG. 1) to allow additional exposed surfaces of a formed product to radiate heat to corresponding surfaces of other formed products.

Another advantage of the foregoing arrangement is that it can be used to produce a structural building block and/or an architectural construct, as well as clean burning hydrogen fuel from a hydrogen donor. When the precursor gas includes a hydrocarbon, the architectural construct can include graphene and/or another carbon-bearing material, for example, a material that can be further processed to form a carbon-based composite or a carbon-based polymer. In other embodiments, the precursor gas can include other elements (e.g., boron, nitrogen, sulfur, silicon, and/or a transition metal) than can also be used to form structural building blocks that contain the element, and/or architectural constructs formed from the building blocks. Suitable processes and representative architectural constructs are further described in the following co-pending U.S. Patent Applications, all of which are filed concurrently herewith and are incorporated herein by reference: application Ser. No. 13/027,208 titled "CHEMICAL PROCESSES AND REACTORS FOR EFFICIENTLY PRODUCING HYDROGEN FUELS AND STRUCTURAL MATERIALS, AND ASSOCIATED SYSTEMS AND METHODS"; application Ser. No. 13/027,214 titled "ARCHITECTURAL CONSTRUCT HAVING FOR EXAMPLE A PLURALITY OF ARCHITECTURAL CRYSTALS"; and application Ser. No. 13/027,068 titled "CARBON-BASED DURABLE GOODS AND RENEWABLE FUEL FROM BIOMASS WASTE DISSOCIATION".

One feature of an embodiment described above with reference to FIG. 1 is that it may be conducted in a batch process. For example, each of the first and second formed structures 140a, 140b can be grown by a particular amount and then removed from the reaction vessel 111. In another embodiment described below with reference to FIG. 2, the products can be formed in a continuous manner, without the need for halting the reaction to remove the product.

Figure 2:
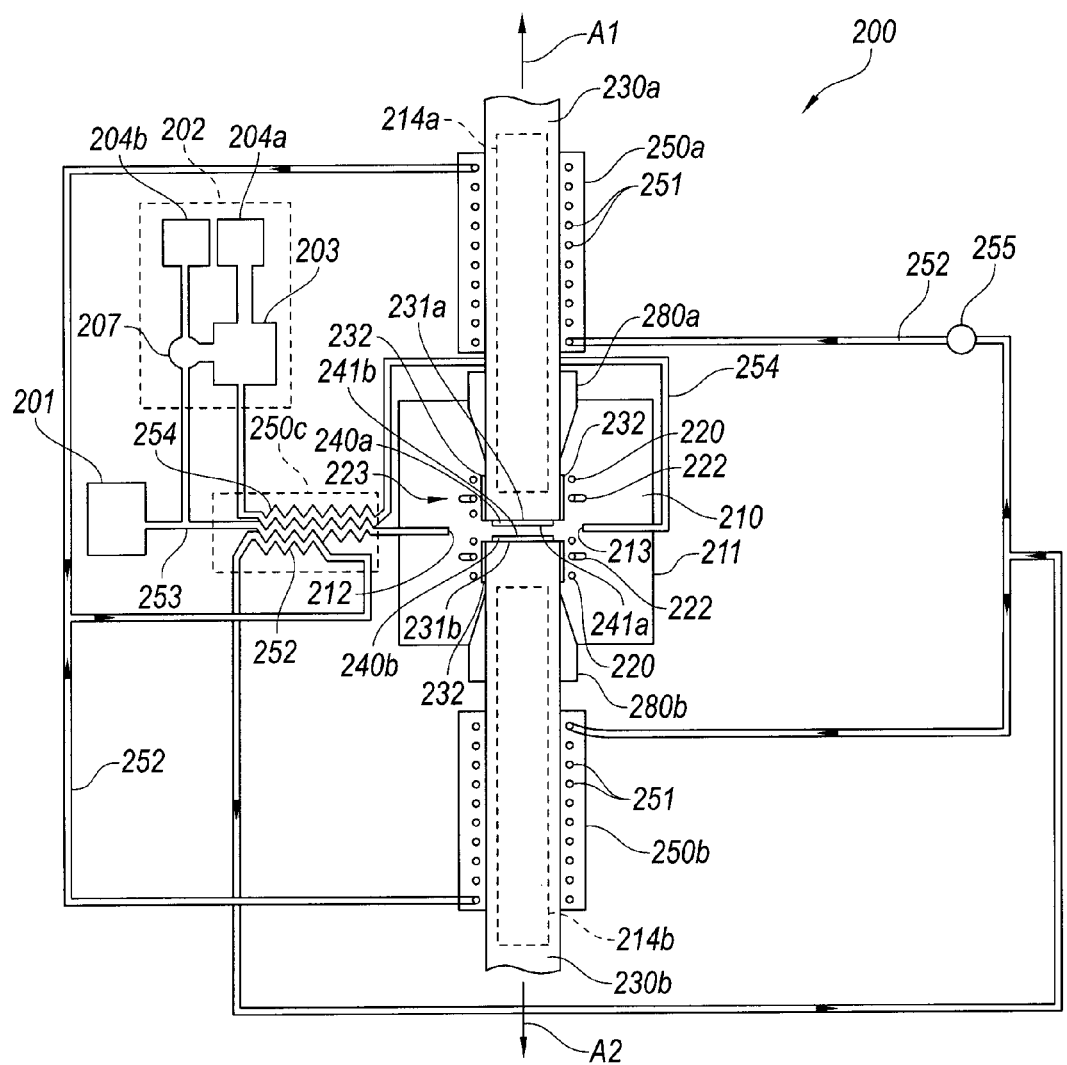
FIG. 2 is a partially schematic illustration of a system having a reactor with facing substrates configured to operate in a continuous manner, in accordance with another embodiment of the presently disclosed technology.

FIG. 2 illustrates a system 200 that includes a reactor 210 having a reactor vessel 211 configured to operate in a continuous flow manner in accordance with another embodiment of the disclosed technology. In one aspect of this embodiment, the reactor 210 has a first substrate support 214a that carries a first substrate 230a (e.g., a cylindrical substrate), and a second substrate support 214b that carries a second substrate 230b. Each substrate 230a, 230b has a corresponding (initially) exposed surface 231a, 231b facing toward the other. The exposed surfaces 231a, 231b are positioned in an induction zone 223 that is heated by a corresponding induction coil 220, sections of which are visible in FIG. 2. The heat provided by the induction coil 220 can in some cases be supplemented by an additional heat source 222, e.g. a combustor. As the dissociated constituent (e.g., carbon) is deposited on the exposed surfaces 231a, 231b of the substrates 230a, 230b, it forms corresponding products 240a, 240b, each with a corresponding exposed surface 241a, 241b which can extend to the outer periphery of the corresponding substrate 230a, 230b. The substrates 230a, 230b are withdrawn from the induction zone 223 in opposite directions, as indicated by arrows A1 and A2. This allows additional product to be formed on the newly formed, exposed surfaces 241a, 241b of the product 240a, 240b carried by the substrates 230a, 230b at the induction zone 223. To facilitate this operation, the reactor 210 can include corresponding seals 280a, 280b, each positioned around a corresponding one of the substrates 230a, 230b. The seals 280a, 280b allow the substrates 230a, 230b and the corresponding product 240a, 240b carried by the substrates to be withdrawn from the reactor vessel 211 without a significant loss of the gases present in the reactor vessel 211. In a representative embodiment, the seals 280a, 280b can include high temperature labyrinth seals, and in other embodiments, can include other configurations.

The system 200 can also include features for re-using heat generated within the reactor 210. For example, the system 200 can include one or more heat exchangers 250 (three are shown in FIG. 2 as a first heat exchanger 250a, a second heat exchanger 250b, and a third heat exchanger 250c) that capture heat from the products and constituents removed from the reactor vessel 211 and return the heat to the precursor gas entering the reaction vessel 211. This arrangement reduces the amount of power required by the induction coil 220 to heat the induction zone 223. In a particular embodiment, the first and second heat exchangers 250a, 250b are each positioned in close thermal communication with a corresponding one of the substrates 230a, 230b and the product 240a, 240b formed at the ends of these substrates. Each of the first and second heat exchangers 250a, 250b can include corresponding heat exchanger coils 251 (sections of which are visible in FIG. 2) that carry a heat exchanger fluid. The heat exchanger fluid is routed around a fluid path 252 by one or more pumps 255. In a particular embodiment, the heat exchanger fluid can include water/steam, and in other embodiments can include other suitable heat transfer media. The heat exchanger fluid passes through the coils 251 at each of the first and second heat exchangers 250a, 250b where it is heated by the substrate 230a, 230b and associated product 240a, 240b, and provides this heat to the third heat exchanger 250c. At the third exchanger 250c, the heat provided by the heat exchanger fluid proceeding around the fluid path 252 is transferred to the precursor gas as the gas proceeds along a precursor gas flow path 253 from a precursor gas source 201 to an entrance port 212 of the vessel 211. Such arrangements regeneratively heat the precursor gas to a temperature approaching the dissociation temperature. The additional heat for dissociation is then provided by inductive heating in the vessel 211.

As discussed above, the dissociation and deposition processes can produce gaseous products, residual and unused reactants and other constituents. These heated constituents exit the reactor vessel 211 via an exit port 213 and are routed along a product flow path 254 through the third heat exchanger 250c. At the third heat exchanger 250c, the product flow path 254 is positioned in close thermal communication with the precursor flow path 253 to transfer heat to the precursor gas entering the reaction vessel 211.

After exiting the third heat exchanger 250c, the products removed from the reactor vessel 211 enter a collection system 202, which can include a separator 203. The separator 203 can separate the product gases, for example, into a first product delivered to a first product collector 204a, and a second product delivered to a second product collector 204b. In a particular example, when the precursor gas includes methane, the first product collector 204a can collect pure hydrogen, and the second product collector 204b can collect a mixture of hydrogen, un-dissociated methane and/or undeposited carbon. The pure hydrogen can be used by power generators that require a particular level of hydrogen purity, for example, a fuel cell, as discussed above. The second product (e.g., a mixture of hydrogen and methane) can be delivered to other power generators that do not require the same level of purity. Such generators can include turbine engines and/or internal combustion engines, as was also discussed above. In a particular embodiment, at least some of the methane-containing product is routed via a valve 207 back to the precursor gas source 201 for dissociation at the reactor 210.

One feature of several of the foregoing embodiments is that they include arrangements that conserve energy and/or recycled constituents. For example, as discussed above, the facing surfaces of the supports and the deposited product carried by the supports reduces the overall radiative thermal losses in the system. The heat exchangers can, in addition to or in lieu of the foregoing feature, return heat generated by the product formation process to incoming reactants, again reducing the overall amount of energy consumed by the system. Products other than the durable goods or element used to form durable goods at the reactor can be reused for other purposes, e.g., power generation purposes.

From the foregoing, it will be appreciated that specific embodiments of the technology have been described herein for purposes of illustration, but that various modifications may be made without deviating from the technology. For example, the precursor gas delivered to the reactor can include hydrocarbon compounds other than methane in other embodiments. Such compounds can include a variety of hydrocarbon fuels and/or alcohols. In still further embodiments, the precursor can include carbon-containing donors that do not include hydrogen, and in still further embodiments, the precursor gas can include a donor other than carbon. In such instances, the precursor gas can include a nitrogenous or other compound to form a durable good or durable good constituent based on an element other than carbon.

Certain aspects of the technology described in the context of particular embodiments may be combined or eliminated in other embodiments. For example, the heat exchangers described in the context above a continuous flow embodiment shown in FIG. 2 may also be applied to the batch flow process described above with reference to FIG. 1. Further, while advantages associated with certain embodiments of the technology have been described in the context of those embodiments, other embodiments may also exhibit such advantages, and not all embodiments need necessarily exhibit such advantages to fall within the scope of the present disclosure. Accordingly, the present disclosure and associated technology can encompass other embodiments not expressly shown or described herein.

To the extent not previously incorporated herein by reference, the present application incorporates by reference in their entirety the subject matter of each of the following materials: U.S. patent application Ser. No. 12/857,553, filed on Aug. 16, 2010 and titled SUSTAINABLE ECONOMIC DEVELOPMENT THROUGH INTEGRATED PRODUCTION OF RENEWABLE ENERGY, MATERIALS RESOURCES, AND NUTRIENT REGIMES; U.S. patent application Ser. No. 12/857,553, filed on Aug. 16, 2010 and titled SYSTEMS AND METHODS FOR SUSTAINABLE ECONOMIC DEVELOPMENT THROUGH INTEGRATED FULL SPECTRUM PRODUCTION OF RENEWABLE ENERGY; U.S. patent application Ser. No. 12/857,554, filed on Aug. 16, 2010 and titled SYSTEMS AND METHODS FOR SUSTAINABLE ECONOMIC DEVELOPMENT THROUGH INTEGRATED FULL SPECTRUM PRODUCTION OF RENEWABLE MATERIAL RESOURCES USING SOLAR THERMAL; U.S. patent application Ser. No. 12/857,502, filed on Aug. 16, 2010 and titled ENERGY SYSTEM FOR DWELLING SUPPORT; U.S. patent application Ser. No. 13/027,235, filed on Feb. 14, 2011 and titled DELIVERY SYSTEMS WITH IN-LINE SELECTIVE EXTRACTION DEVICES AND ASSOCIATED METHODS OF OPERATION; U.S. Patent Application No. 61/401,699, filed on Aug. 16, 2010 and titled COMPREHENSIVE COST MODELING OF AUTOGENOUS SYSTEMS AND PROCESSES FOR THE PRODUCTION OF ENERGY, MATERIAL RESOURCES AND NUTRIENT REGIMES; U.S. patent application Ser. No. 13/027,208, filed on Feb. 14, 2011 and titled CHEMICAL PROCESSES AND REACTORS FOR EFFICIENTLY PRODUCING HYDROGEN FUELS AND STRUCTURAL MATERIALS, AND ASSOCIATED SYSTEMS AND METHODS; U.S. patent application Ser. No. 13/026,996, filed on Feb. 14, 2011 and titled REACTOR VESSELS WITH TRANSMISSIVE SURFACES FOR PRODUCING HYDROGEN-BASED FUELS AND STRUCTURAL ELEMENTS, AND ASSOCIATED SYSTEMS AND METHODS; U.S. patent application Ser. No. 13/027,015, filed on Feb. 14, 2011 and titled CHEMICAL REACTORS WITH RE-RADIATING SURFACES AND ASSOCIATED SYSTEMS AND METHODS; U.S. patent application Ser. No. 13/027,244, filed on Feb. 14, 2011 and titled THERMAL TRANSFER DEVICE AND ASSOCIATED SYSTEMS AND METHODS; U.S. patent application Ser. No. 13/026,990, filed on Feb. 14, 2011 and titled CHEMICAL REACTORS WITH ANNULARLY POSITIONED DELIVERY AND REMOVAL DEVICES, AND ASSOCIATED SYSTEMS AND METHODS; U.S. patent application Ser. No. 13/027,181, filed on Feb. 14, 2011 and titled REACTORS FOR CONDUCTING THERMOCHEMICAL PROCESSES WITH SOLAR HEAT INPUT, AND ASSOCIATED SYSTEMS AND METHODS; U.S. patent application Ser. No. 13/027,198, filed on Feb. 14, 2011 and titled COUPLED THERMOCHEMICAL REACTORS AND ENGINES, AND ASSOCIATED SYSTEMS AND METHODS; U.S. Patent Application No. 61/385,508, filed on Sep. 22, 2010 and titled REDUCING AND HARVESTING DRAG ENERGY ON MOBILE ENGINES USING THERMAL CHEMICAL REGENERATION; U.S. patent application Ser. No. 13/027,060, filed on Feb. 14, 2011 and titled REACTOR VESSELS WITH PRESSURE AND HEAT TRANSFER FEATURES FOR PRODUCING HYDROGEN-BASED FUELS AND STRUCTURAL ELEMENTS, AND ASSOCIATED SYSTEMS AND METHODS; U.S. patent application Ser. No. 13/027,214, filed on Feb. 14, 2011 and titled ARCHITECTURAL CONSTRUCT HAVING FOR EXAMPLE A PLURALITY OF ARCHITECTURAL CRYSTALS; U.S. patent application Ser. No. 12/806,634, filed on Aug. 16, 2010 and titled METHODS AND APPARATUSES FOR DETECTION OF PROPERTIES OF FLUID CONVEYANCE SYSTEMS; U.S. patent application Ser. No. 13/027,188, filed on Feb. 14, 2011 and titled METHODS, DEVICES, AND SYSTEMS FOR DETECTING PROPERTIES OF TARGET SAMPLES; U.S. patent application Ser. No. 13/027,068, filed on Feb. 14, 2011 and titled SYSTEM FOR PROCESSING BIOMASS INTO HYDROCARBONS, ALCOHOL VAPORS, HYDROGEN, CARBON, ETC.; U.S. patent application Ser. No. 13/027,196, filed on Feb. 14, 2011 and titled CARBON RECYCLING AND REINVESTMENT USING THERMOCHEMICAL REGENERATION; U.S. patent application Ser. No. 13/027,195, filed on Feb. 14, 2011 and titled OXYGENATED FUEL; U.S. Patent Application No. 61/237,419, filed on Aug. 27, 2009 and titled CARBON SEQUESTRATION; U.S. Patent Application No. 61/237,425, filed on Aug. 27, 2009 and titled OXYGENATED FUEL PRODUCTION; U.S. patent application Ser. No. 13/027,197, filed on Feb. 14, 2011 and titled MULTI-PURPOSE RENEWABLE FUEL FOR ISOLATING CONTAMINANTS AND STORING ENERGY; U.S. Patent Application No. 61/421,189, filed on Dec. 8, 2010 and titled LIQUID FUELS FROM HYDROGEN, OXIDES OF CARBON, AND/OR NITROGEN; AND PRODUCTION OF CARBON FOR MANUFACTURING DURABLE GOODS; and U.S. patent application Ser. No. 13/027,185, filed on Feb. 14, 2011 and titled ENGINEERED FUEL STORAGE, RESPECIATION AND TRANSPORT.

I claim:

1. A method for forming a material, comprising:
   placing a first substrate in a reactor, the first substrate having an exposed first surface;
   placing a second substrate in the reactor, the second substrate having an exposed second surface facing toward the first surface;
   insulating otherwise exposed surfaces of the first substrate, other than the first surface, to at least restrict radiation from the first substrate except at the first surface;
   insulating otherwise exposed surfaces of the second substrate, other than the second surface, to at least restrict radiation from the second substrate except at the second surface;
   directing a precursor gas into the reactor;
   activating an induction coil proximate to the first and second surfaces to dissociate the precursor gas;
   depositing a constituent of the precursor gas on both the first and second surfaces;
   receiving heat radiated from (a) at least one of the first surface and the constituent deposited on the first surface at (b) at least one of the second surface and the constituent deposited on the second surface; and
   receiving heat radiated from (a) at least one of the second surface and the constituent deposited on the second surface at (b) at least one of the first surface and the constituent deposited on the first surface.

2. The method of claim 1 wherein directing a precursor gas includes directing methane.

3. The method of claim 1 wherein depositing a constituent includes depositing carbon.

4. The method of claim 1 wherein the precursor gas includes a hydrogen compound, and wherein the method further comprises dissociating hydrogen from the compound, and wherein depositing a constituent includes depositing a constituent of the compound remaining after dissociating the hydrogen.

5. The method of claim 4, further comprising removing the hydrogen from the reactor and providing the hydrogen as a fuel.

6. The method of claim 5, further comprising separating the hydrogen into a first portion having a first level of purity and a second portion having a second level of purity less than the first, and wherein the method further comprises:
   producing electrical energy with the first portion at a fuel cell; and
   combusting the second portion at an engine.

7. The method of claim 1, further comprising withdrawing the first and second substrates from the reactor in a continuous manner while the constituent is deposited on the first and substrates.

8. The method of claim 7 wherein withdrawing includes withdrawing the first and second substrates in opposite directions.

9. The method of claim 8 wherein withdrawing includes withdrawing the first substrate through a first seal of the reactor and withdrawing the second substrate through a second seal of the reactor to at least restrict gases from escaping the reactor.

10. The method of claim 1, further comprising:
    halting the process of depositing the constituent; and
    removing the first and second substrates from the reactor while the process of depositing the constituent is halted.

11. A method for forming a material, comprising:
    placing a first graphite substrate in an induction zone of a reactor, the first graphite substrate having a first exposed surface;
    placing a second graphite substrate in the induction zone of the reactor, the second graphite substrate having a second surface facing toward the first surface;
    directing methane into the induction zone;
    activating an induction coil around the induction zone to dissociate the methane into carbon and hydrogen;
    epitaxially growing carbon on the first and second surfaces;
    recycling heat within the induction zone by:
       receiving heat radiated from (a) at least one of the first surface and the carbon grown on the first surface at (b)

at least one of the second surface and the carbon grown on the second surface;

receiving heat radiated from (a) at least one of the second surface and the carbon grown on the second surface at (b) at least one of the first surface and the carbon grown on the first surface;

at least restricting radiation from any surface of the first graphite substrate other than the first surface; and at least restricting radiation from any surface of the second graphite substrate other than the second surface.

12. The method of claim 11, further comprising withdrawing the first and second substrates and epitaxially grown carbon from the reactor in opposite directions through corresponding first and second seals to at least restrict gases from escaping the reactor.

13. The method of claim 11, further comprising:
receiving first heat from at least one of the first substrate and carbon grown on the first substrate;
receiving second heat from at least one of the second substrate and carbon grown on the second substrate;
removing dissociated hydrogen from the induction zone;
receiving third heat from the hydrogen removed from the induction zone;
transferring at least a portion of the first, second and third heats to a volume of methane; and
directing the volume of methane into the induction zone for dissociation.

14. A method for forming a material, comprising:
placing a first substrate in a reactor, the first substrate having an exposed first surface;
placing a second substrate in the reactor, the second substrate having an exposed second surface facing toward the first surface;
directing a precursor gas into the reactor;
activating an induction coil proximate to the first and second surfaces to dissociate the precursor gas;
depositing a constituent of the precursor gas on both the first and second surfaces;
receiving heat radiated from (a) at least one of the first surface and the constituent deposited on the first surface at (b) at least one of the second surface and the constituent deposited on the second surface;

receiving heat radiated from (a) at least one of the second surface and the constituent deposited on the second surface at (b) at least one of the first surface and the constituent deposited on the first surface; and withdrawing the first and second substrates from the reactor in a continuous manner while the constituent is deposited on the first and substrates.

15. The method of claim 14, further comprising:
insulating otherwise exposed surfaces of the first substrate, other than the first surface, to at least restrict radiation from the first substrate except at the first surface; and
insulating otherwise exposed surfaces of the second substrate, other than the second surface, to at least restrict radiation from the second substrate except at the second surface.

16. The method of claim 14 wherein directing a precursor gas includes directing methane.

17. The method of claim 14 wherein the precursor gas includes a hydrogen compound, and wherein the method further comprises dissociating hydrogen from the compound, and wherein depositing a constituent includes depositing a constituent of the compound remaining after dissociating the hydrogen.

18. The method of claim 17, further comprising removing the hydrogen from the reactor and providing the hydrogen as a fuel.

19. The method of claim 18, further comprising separating the hydrogen into a first portion having a first level of purity and a second portion having a second level of purity less than the first, and wherein the method further comprises:
producing electrical energy with the first portion at a fuel cell; and
combusting the second portion at an engine.

20. The method of claim 14 wherein withdrawing includes withdrawing the first and second substrates in opposite directions.

* * * * *